INVENTOR.
CHADWICK A. COOMBS

April 18, 1961 C. A. COOMBS 2,980,667
ROTATING FUEL ELEMENT REACTOR PUMP
Filed Oct. 31, 1958 2 Sheets-Sheet 2
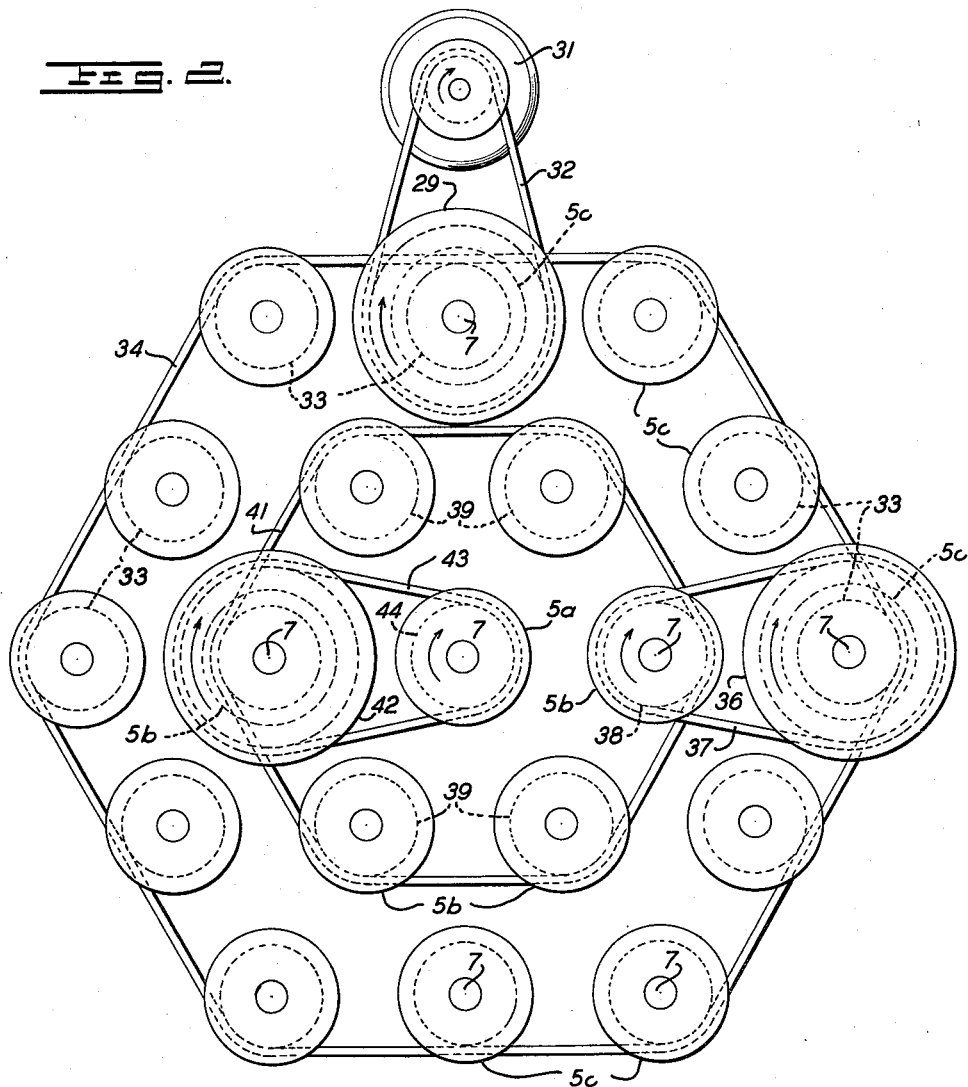
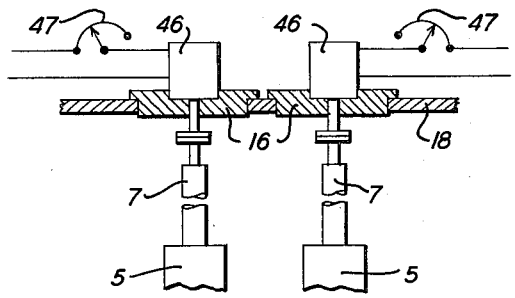
INVENTOR.
CHADWICK A. COOMBS
BY
ATTORNEY

United States Patent Office 2,980,667
Patented Apr. 18, 1961

2,980,667

ROTATING FUEL ELEMENT REACTOR PUMP

Chadwick A. Coombs, Washington, D.C., assignor, by mesne assignments, to Allis-Chalmers Manufacturing Company, a corporation of Delaware Filed Oct. 31, 1958, Ser. No. 770,972

10 Claims. (Cl. 204—193.2)

This invention relates to nuclear reactors and, more particularly, to research reactors designed for the purpose of conducting experiments to gain information. Reactors of this type produce a large supply of neutrons and gamma rays for research, such radiations being used at the core of the reactor where they are produced or outside the reactor where they are led by special openings built into the reactor structure.

Conventional research reactors are provided with a core of fuel elements, each comprising a plurality of spaced, enriched uranium fuel plates enclosed within a tubular housing. During operation, light or heavy water is circulated through the fuel elements to serve as a coolant and neutron moderator. In tank type reactors, the water is usually directed into a plenum chamber and thence upwardly in equal quantities through the several fuel elements forming the reactor core and, as a result thereof, some of the elements in the core operate at such a high temperature as to cause damage to the fuel plates therein, while other elements operate at a relatively low temperature.

It is, therefore, an object of the invention to provide a research reactor wherein the several fissionable fuel elements forming the core may be operated at a substantially equal temperature.

Another object of the invention resides in the provision of a fuel element comprising a fissionable fuel plate of helical form mounted for rotational movement to serve as an axial flow pump to move the liquid moderator and coolant through the fuel element.

A further object of the invention resides in the provision of means for rotating a core of fuel plates at different speeds to maintain the several fuel plates at a substantially equal temperature during operation of the reactor.

Another object is to provide a fuel element for a tank type research reactor containing light or heavy water as a moderator and cooling, wherein the fuel element acts as a pump to move the water from a plenum chamber and through the fuel element into the tank.

Another object is to provide a fuel element wherein a helical fuel plate is secured to a rotatable central tube which provides a wet irradiation facility for materials to be tested.

Another object of the invention is to provide a fuel element embodying a single helical fuel plate having an area and volume equal to 18 fuel plates in a conventional fuel element of the MTR type.

The invention embodies other novel features, details of construction and arrangement of parts which are hereinafter set forth in the specification and claims and illustrated in the accompanying drawings, forming part thereof, wherein:

Fig. 2 is a schematic plan view illustrating the arrangement of fuel elements within the reactor core, and com-means for rotating the fuel elements.

Fig. 3 is a fragmentary view in which the several fuel elements are provided within individual driving motors.

Figure 1:
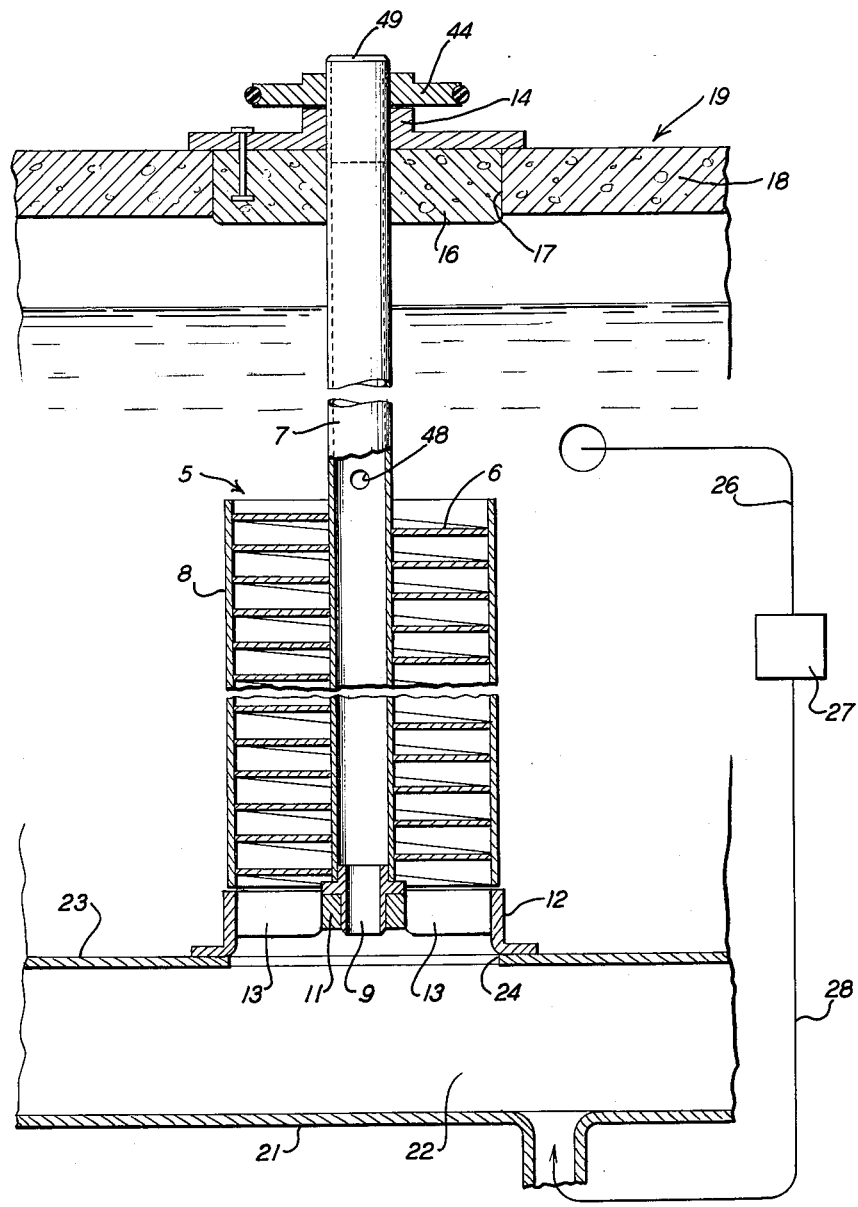
Fig. 1 is a fragmentary vertical section of a tank type heterogeneous nuclear reactor provided with a core of fuel elements embodying features of the invention.

Referring now to the drawings for a better understanding of the invention, each fuel element 5 is shown as comprising a coil of fissionable material defining a helical fuel plate 6 having its inner peripheral edge secured to a shaft shown as an imperforate central tube 7 formed of aluminum or stainless steel. The outer peripheral edge of the fuel plate is secured to an outer imperforate tube 8 formed of aluminum or stainless steel. The helical fuel plate in this arrangement defines a spiral portion disposed between imperforate wall members to provide a helical passage therebetween.

To provide a fuel element of a size corresponding generally to the size of a conventional MTR fuel element, the outer diameter of the central tube 7 may be one inch, the inner diameter of the outer tube 8 may be 4 inches, and the length of the outer tube and helical fuel plate therein may be approximately 23 inches. To provide a volume of fissionable material corresponding to the volume of fissionable material in the fuel plates in the MTR fuel element, the helical fuel plate 6 may have a thickness of 0.060 inch and a pitch of 0.20 inch. The fuel plate 6 is formed of an aluminum-uranium alloy enriched with uranium 235.

Each fuel element 5 is journaled on its axis for rotation. As shown in Fig. 1, a tubular stainless steel inlet nozzle 9 is secured to the lower end of the central tube 7 and journaled in a bearing 11 provided on a plenum outlet nozzle 12 formed with radial vanes 13 for directing fluid upwardly through the fuel element. The upper end of the central tube 7 is shown as journaled in a bearing 14 provided on a removable plug 16 normally seated in an opening 17 formed in a lower shield plug 18 of a conventional heavy water moderated reactor 19.

The reactor 19 is shown as comprising a tank 21 provided with a plenum chamber 22 and a plenum wall 23 formed with ports 24 for the passage of moderating and cooling liquid to the fuel elements. The tank is provided with a liquid outlet conduit 26 leading to a heat exchanger 27 having a conduit 28 leading to the plenum chamber 22.

As illustrated schematically in Fig. 2, the reactor core comprises a plurality of fuel elements spaced, for example, on six inch centers to provide a central fuel element 5a enclosed within an inner circle of fuel elements 5b and an outer circle of fuel elements 5c. A pulley 29 is secured to the upper end of the central tube 7 of a fuel element 5c to be driven by an electric motor 31 acting through an endless belt 32. Pulleys 33 are secured to the upper ends of the central tubes 7 of the fuel elements 5c for engagement by a common belt 34.

A pulley 36 secured to a fuel element 5c acts through a belt 37 to drive a relatively smaller diameter pulley 38 secured to the fuel elements 5b. Pulleys 39 are secured to the fuel elements 5b for engagement by a common endless belt 41. A pulley 42 secured to a fuel element 5b acts through a belt 43 to drive a relatively smaller diameter pulley 44 secured to the fuel element 5a. By means of the pulley and belt arrangement, thus shown and described, it will be noted that the fuel elements 5b will rotate faster than the fuel elements 5c; and that the fuel element 5a will rotate faster than the fuel elements 5b.

Fig. 3 illustrates a modified form of the invention wherein each fuel element 5 within a reactor core is driven by its individual variable-speed electric motor 46 controlled by individual rheostats 47, whereby the fuel elements may be rotated at different speeds for increasing or decreasing the flow of coolant therethrough to maintain the temperature of the several fuel plates 6 within predetermined limits.

The invention shown and described is particularly adapted for use in tank type, heavy water moderated reactors, such as the Massachusetts Institute of Technology Reactor (MITR) or the Argonne Research Reactor (CP-5) which are shown and described in a book entitled "U.S. Research Reactors" available from the Office of Technical Services, U.S. Department of Commerce, Washington, D.C., and the disclosure therein is incorporated herein by reference. However, it is apparent that the invention is adapted for use in other types of nuclear reactors.

During operation, the several fuel elements 5 are rotated in a direction to cause the helical fuel plates 6 to draw the liquid coolant and moderator upwardly from the plenum chamber 22 and through the helical passage defined in the fuel elements into the upper end of the tank 21, the liquid being returned from the tank to the plenum chamber through the conduits 26 and 28. The liquid is free to circulate upwardly through the central tubes 7 and outwardly therefrom through the outlet openings 48. By removing the plug 49 from the upper end of a central tube 7, a thimble or capsule containing material may be lowered into the tube for conducting irradiation experiments within a high flux zone in the fuel element or core of elements.

Having described a preferred embodiment of the present invention, it is to be understood that although specific terms and examples are employed, they are used in a generic and descriptive sense and not for purposes of limitation; the scope of the invention being set forth in the following claims:

What is claimed is:

1. In a heterogeneous nuclear reactor containing a moderating and cooling liquid, a fuel element comprising a coil of fissionable material and wall means associated therewith so as to define a spiral passage having liquid inlet and outlet openings, respectively, at its opposite ends, and means mounting said fuel element for rotational movement thereof on the axis of said coil; said liquid inlet and outlet openings communicating with said liquid so that movement of said fuel element will cause said liquid to circulate through said passage.

2. In a heterogeneous nuclear reactor containing a moderating and cooling liquid, a fuel element comprising a coil of fissionable material and wall means associated therewith so as to define a spiral passage having liquid inlet and outlet openings, respectively, at its opposite ends, and means mounting said fuel element submerged within said liquid for rotational movement on the axis of said coil and means to rotate said fuel element on its axis in a direction so as to cause circulation of said liquid through said passage.

3. In a nuclear reactor fuel element, a helical fuel plate containing fissionable material, a shaft secured to the inner peripheral edge of said plate, an imperforate tubular member secured to the outer peripheral edge of said plate, said fuel plate, shaft, and tubular member defining an open ended helical passage for the flow of liquid therethrough.

4. In a heterogeneous nuclear reactor containing a moderating and cooling liquid, a tubular fuel element submerged within said liquid and journaled on its axis for rotational movement therein, said fuel element comprising radially inner and outer imperforate wall members and a spiral partition therebetween so as to provide a helical fluid passage having inlet and outlet openings at the axially opposite ends, respectively, of said fuel element; and drive means for rotating said fuel element on said axis and thereby cause circulation of said liquid through said passage.

5. In a heterogeneous nuclear reactor containing a moderating and cooling liquid, a tubular fuel element submerged within said liquid and journaled on its axis for rotational movement therein, said fuel element comprising radially inner and outer imperforate wall members and a spiral fissionable partition therebetween so as to provide a helical fluid passage having inlet and outlet openings at the axially opposite ends respectively of said fuel element, and drive means for rotating said fuel element on said axis and thereby cause circulation of said liquid through said passage.

6. In a heterogeneous nuclear reactor, a tank containing a moderating and cooling liquid, a core of tubular fuel elements submerged within said liquid, with each element journaled on its axis for rotational movement therein, each fuel element embodying a spiral fissionable member and associated radially inner and outer imperforate wall members affording a helical passage for the circulation of said liquid therethrough upon rotational movement of the fuel element, and means to rotate the several fuel elements at different relative speeds.

7. In a heterogeneous nuclear reactor, a tank containing a moderating and cooling liquid, a core of tubular fuel elements submerged within said liquid, with each element journaled on its axis for rotational movement therein, each fuel element embodying a spiral fissionable member and associated radially inner and outer imperforate wall members affording a helical passage for the circulation of said liquid therethrough upon rotational movement of the fuel element, and common drive means to rotate the several fuel elements at different relative speeds.

8. In a heterogeneous nuclear reactor, a tank containing a moderating and cooling liquid, a core of tubular fuel elements submerged within said liquid, with each element journaled on its axis for rotational movement therein, each fuel element embodying a spiral fissionable member and associated radially inner and outer imperforate wall members affording a helical passage for the circulation of said liquid therethrough upon rotational movement of the fuel element, and individual drive means to rotate the several fuel elements at different relative speeds.

9. In a heterogeneous nuclear reactor, a tank containing a moderating and cooling liquid, a core of tubular fuel elements submerged within said liquid, with each element journaled on its axis for rotational movement therein, each fuel element embodying a spiral fissionable member and associated radially inner and outer imperforate wall members affording a helical passage for the circulation of said liquid therethrough upon rotational movement of the fuel element, said tank having a plenum chamber provided with ports for the flow of liquid upwardly through the several fuel elements, and means to recirculate liquid from the tank to the plenum chamber.

10. In a heterogeneous nuclear reactor, a tank containing a moderating and cooling liquid, a core of tubular fuel elements submerged within said liquid, with each element journaled on its axis for rotational movement therein, each fuel element embodying a spiral fissionable member and associated radially inner and outer imperforate wall members affording a helical passage for the circulation of said liquid therethrough upon rotational movement of the fuel element, said tank having a plenum chamber provided with ports for the flow of liquid upwardly through the several fuel elements, means to recirculate liquid from the tank to the plenum chamber, said means including a heat exchanger.

References Cited in the file of this patent

UNITED STATES PATENTS 2,812,304    Wheeler _____ Nov. 5, 1957

FOREIGN PATENTS 797,608    Great Britain _____ July 2, 1958

UNITED STATES PATENT OFFICE
CERTIFICATE OF CORRECTION

April 18, 1961

Patent No. 2,980,667

Chadwick A. Coombs

It is hereby certified that error appears in the above numbered patent requiring correction and that the said Letters Patent should read as corrected below.

Column 3, line 43, after "that" insert -- rotational --.

Signed and sealed this 19th day of September 1961.

(SEAL)
Attest:

ERNEST W. SWIDER
Attesting Officer

DAVID L. LADD
Commissioner of Patents
USCOMM-DC